Dec. 23, 1969  H. J. MARLING  3,485,529
VEHICLE SEATBELT FASTENING DEVICE
Filed Jan. 23, 1968
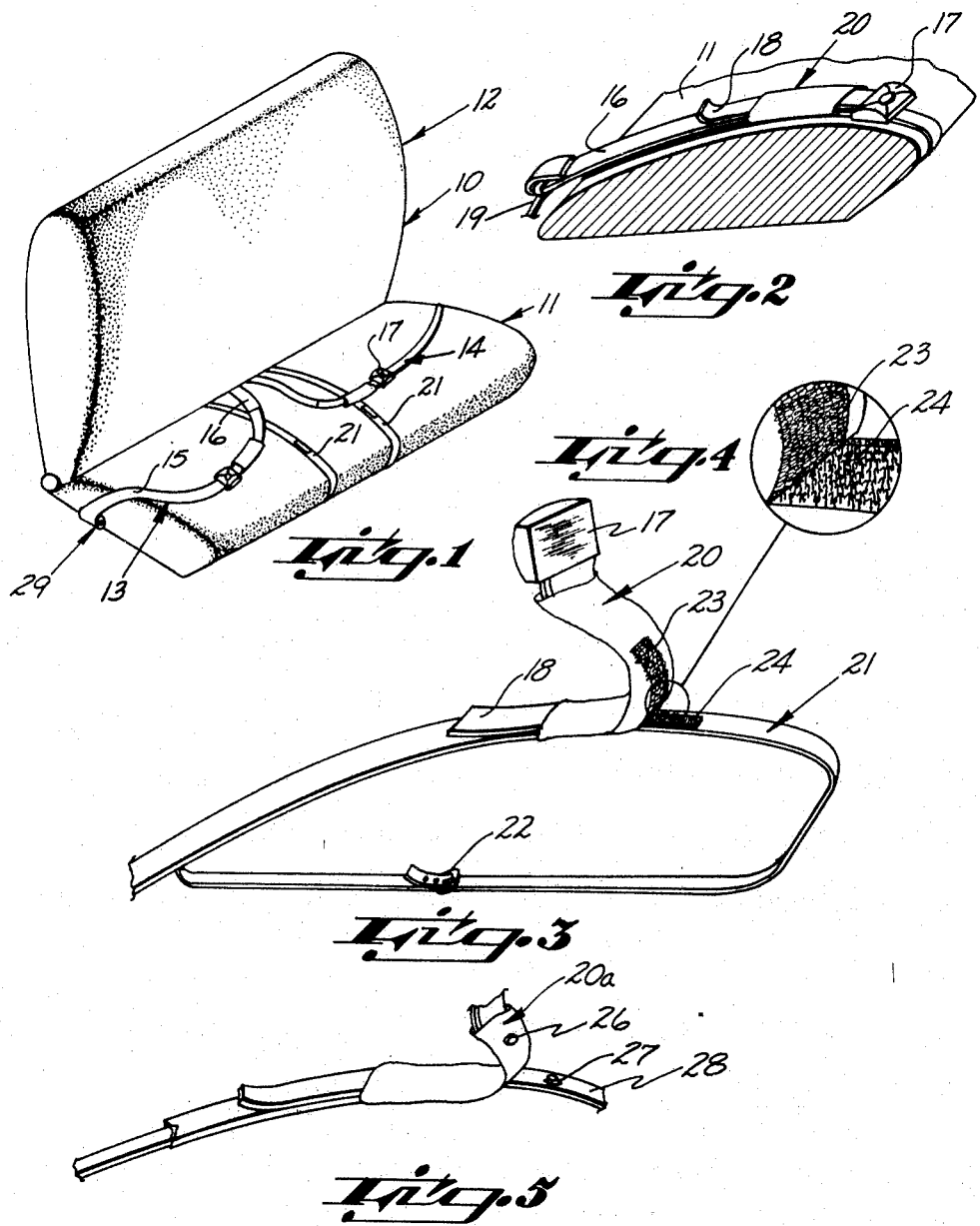
INVENTOR.
Henry J. Marling
BY
Wood, Herron & Evans
ATTORNEYS United States Patent Office 3,485,529
Patented Dec. 23, 1969

3,485,529
VEHICLE SEATBELT FASTENING DEVICE
Henry J. Marling, 3696 Dogwood Lane,
Cincinnati, Ohio 45241
Filed Jan. 23, 1968, Ser. No. 699,840
Int. Cl. B60r 21/10; A62b 35/00; A44b 11/00
U.S. Cl. 297—385                                     8 Claims

ABSTRACT OF THE DISCLOSURE

A device for securing the loose end of an automobile seat belt to the seat when the belt is not in use. The device comprises a sleeve adapted to be secured over the loose end of the seatbelt and an anchor belt adapted to be wrapped around the vehicle seat. Both the anchor belt and the sleeve have fasteners secured thereto such that the seatbelt sleeve may be attached to the anchor belt when the seat belt is not in use.

---

This invention relates to vehicle seat belts and particularly to a fastening device for securing the loose end of an automobile seatbelt in place when the belt is not in use.

Automobile seatbelts are installed in very nearly all automobiles and are required by law in the United States to be installed in all new automobiles. While the belts are consequently available for use, they are often ignored because of the inconvenience of locating the loose dangling ends, unwinding them if they are twisted, and cleaning them if they are soiled as a consequence of having dropped onto the floor or fallen out of the car.

These inconveniences militate against the use of the belts and consequently, solutions have been attempted. One such attempt which has partially resolved the problem has involved the use of spring loaded reels for winding up the outside half of the belt when it is not in use. These reels have taken care of the outer halves of the betls but have done nothing for the inside halves to preclude their becoming twisted or lost between the seat and the back rest.

There have been other efforts to solve the problem but they have all involved some modifications or alterations of the automobile seat or the seatbelt. These alterations could only conveniently be made by the automobile manufacturers who have so far ignored the problem and the solution. It has therefore been a primary objective of this invention to provide an automobile seatbelt fastening device which may readily be added to existing seat belts without any modifications of the vehicle, the vehicle seat or the seatbelt. To this end, the invention of this application comprises an expansible sleeve which may be slipped over the adjustable end of a seatbelt and an anchor belt which may be wrapped around the automobile seat. Both the sleeve and the anchor belt have fasteners thereon by means of which the adjustable end of the belt may be attached to the anchor belt when the seatbelt is not in use. The other end of the seatbelt then retracts into a conventional wind-up reel so that both halves of the seat belt are left convenient for use.

Another advantage of this invention is that the sleeve over the adjustable end of the seatbelt holds the doubled over portions of the adjustable end of the belt in juxtaopsition. The free or loose adjustable end of the belt is thus neatly held in position ready to be grasped and pulled to adjust the length of the belt.

These and other objects and advantages of the invention will be more readily apparent from the following description of the drawings in which:

FIGURE 1 is a perspective view of an automobile or vehicle seat equipped with conventional seatbelts and seat belt fastening devices of this invention.

FIGURE 2 is a perspective view of a portion of one of the seatbelts of FIGURE 1 illustrating a fastening device of this invention in its condition of use for securing the loose end of the seatbelt to an anchor belt when the seatbelt is not in use.

FIGURE 3 is a perspective view similar to FIGURE 2 but illustrating the seatbelt when partially loosened from the anchor belt.

FIGURE 4 is an exploded perspective view of a portion of FIGURE 3.

FIGURE 5 is a perspective view of a second embodiment of the seatbelt fastening device incorporating a different style or fastening for securing the seatbelt to the anchor belt.

Referring first to FIGURE 1, there is illustrated a conventional automobile or vehicle seat having a seat section 11 and a back rest section 12. The vehicle seat 10 is equipped with two conventional seatbelts 13, 14 for securing two passengers in the seat 10. Each belt comprises two sections, one section 15 being secured to the vehicle floor adjacent the side of the seat 11, and the other section 16 being secured to the floor of the vehicle by an anchor 19 located behind the seat and approximately medially of the length of the seat.

The outer section 15 of each belt is secured to the vehicle floor or frame by a conventional spring loaded reel, shown diagrammatically in FIGURE 1 and designated by the numeral 29. The other end of this section 15 of the belt has a conventional metal tongue (not shown) adapted to be located within and secured to a clamp 17 attached to the unsecured end of the other section 16. The clamp 17 is adjustably secured to the free end of the inside section 16 of the belt so that the length of the inside section may be adjusted by pulling the clamp 17 to lengthen the belt when the belt is not in use or by pulling the free end 18 of the doubled over section of the belt to shorten the belt when it is in use. The seatbelt sections 15, 16 per se, the tongue and clamp 17 of the belt buckle, and the belt anchors or attachments to the vehicle floor or frame are all conventional and therefore have not been described in great detail herein.

The fastening device of the invention comprises a sleeve 20 adapted to be mounted over the adjustable length section 16 of the seatbelt and an anchor belt 21 adapted to be attached to the seat or bottom section 11 of the vehicle seat 10. When the seatbelt is not in use and is not being used to secure a passenger in the vehicle seat 10, this fastening device anchors the loose adjustable end section 16 of the seatbelt to the seat 11, as illustrated in FIGURE 2.

The sleeve 20 of the fastening device is adapted to be slipped over the metal clamp 17 of the seatbelt buckle so as to surround or enclose the doubled over end portion of belt adjacent the buckle clamp 17. To enable the sleeve 20 to be slipped over the clamp 17, the sleeve 20 is preferably made from a transversely stretchable fabric or material which stretches to enlarge the diameter of the sleeve so that it can be slipped over the clamp 17. Alternatively, the sleeve could be fitted with a longitudinally extending zipper so that after wrapping the sleeve around the double thickness of belt, the zipper could be secured to enclose the belt within the sleeve at a location on the belt adjacent the clamp 17. By locating the sleeve 20 over the doubled over end portion of the adjustable section 16 of belt, the end portion 18 is always conveniently located on top of the belt and is untwisted so that it may be grasped and pulled through the sleeve and the clamp section 17 to shorten the length of belt.

The anchor belt 21 consists of a strap which is wrapped around the lower seat 11 of the vehicle and is secured onto the seat 11 by a buckle 22. The anchor belt 21 may be made from any material such as leather, plastic or a woven fabric and may be colored to match the color of the vehicle seat.

To attach the sleeve 20 to the anchor belt 21 when the seatbelt is not in use, a looped patch or pad of Velcro material 23 is sewn or otherwise secured to the underside of the sleeve 20. A mating pad 24 of hooked Velcro material is sewn or secured to the top of the strap 21. Preferably, the length of the two pads 23, 24 of Velcro material is sufficient to enable the sleeve to be secured to the anchor belt 21 irrespective of the adjusted length of the seatbelt section 16.

Referring now to FIGURE 5, there is illustrated a second embodiment of the invention incorporating snap fasteners in place of the Velcro fasteners for securing the loose end of the seatbelt to the anchor belt 21. The snap fastener consists of a female section 26 of the snap fastener attached to the underside or bottom of the sleeve 20A and a male section 27 attached to the top of the anchor belt 28. Aside from this difference in fasteners, i.e., the snap fastener in place of the Velcro pad fastener, the sleeve 20A is identical to the sleeve 20 and the strap 28 is identical to the strap 21 described hereinabove.

When the automobile seatbelt is not in use, the section 15 of the seatbelt which has the metal tongue attached to its free end is automatically reeled into the spring loaded reel 29. The opposite adjustable length end 16 of the seatbelt is attached to the anchor belt 21 by placing the two pads 23, 24 of Velcro in engagement or by interengaging the two halves 26, 27 of the snap fastener attached to the sleeve 20 and belt 21 respectively.

In the case of the Velcro fastener, it is preferred that the hooked pad 23 of Velcro be secured to the sleeve rather than the anchor belt 21 because the looped pad is much softer than the hooked pad 24. When the belt is in use, this soft section 23 is then located over the hips of the passenger.

As an alternative to utilizing a separate anchor belt 21 to secure each of the two adjustable length sections 16 of the two seatbelts to the seat 11, a single strap 21 may be used if one or both of the sleeves is slightly modified to include a second fastener. To eliminate one of the anchor belts 21, one or both of the sleeves 20 must be fitted with a hooked pad of Velcro on the top of each sleeve, or otherwise expressed, on the side of the sleeve opposite the looped pad 23. Then, one sleeve 20 of one seatbelt may be attached to the strap 21 by locating the looped pad 23 against the hooked pad 24 and the other sleeve 20 of the other seatbelt may be secured to the top of the first sleeve 20 of the first belt by placing the Velcro pad 23 on the bottom of the second sleeve in engagement with the hooked pad 24 on top of the first sleeve 20. In other words, fasteners identical to the fastener 24 secured to the top of the anchor belt 21 may be secured to the top of one or both of the sleeves 20 so that the bottom of one sleeve 20 may be secured to the top of the other sleeve 20 and the bottom of the other sleeve 20 may in turn be secured to the top of the strap 21.

The primary advantage of the fastening device of this invention is that it enables the seatbelt to be attached to the seat 11 when the belt is not in use without any modification of the vehicle seat 10 or the seatbelts. This fastening device may be attached to any conventional automobile seatbelt and seat by simply affixing the sleeve 20 to the adjustable end of the belt over the doubled over end section of the belt and by wrapping the strap 21 around the seat section 11 of the vehicle seat 10.

Another advantage of this fastening device is that it maintains the loose adjustable end portion 18 of the adjustable section of seatbelt in juxtaposition in the section of belt which it is doubled over. Consequently, the loose end section 18 does not become twisted and is always convenient for use.

While only two different embodiments of fastening devices have been illustrated for securing the sleeve 20 to the strap 21, numerous other conventional devices may be substituted for the different embodiments illustrated herein. Specifically, the stretchable fabric 20 may be made from a loosely woven fabric having loops therein such that no separate pad 23 of looped Velcro material need be attached to the underside of the sleeve. The sleeve itself then serves as the female portion of the coupling into which the hooks 24 of the Velcro pad are inserted. These and other modifications will be readily apparent to those persons skilled in the arts to which this invention pertains.

Having described my invention, I claim:

1. For use in combination with a vehicle seat having a seat and a back rest, a seatbelt comprising a first fixed length section and a second adjustable length section, both of said sections being fixedly secured at one end and being unsecured at the opposite end, said opposite ends terminating in mating portions of a releasable belt buckle, said adjustable section being doubled over adjacent said buckle to enable the length of said adjustable section to be varied, the improvement which comprises a hold down device for securing the opposite unsecured end of said adjustable section of belt to said seat when said belt is not in use, said device comprising a sleeve fitted over said doubled over portion of said adjustable section adjacent said belt buckle and an anchor belt extending completely around said seat and having cooperating attachment means on the opposite ends thereof to enable said opposite ends of said anchor belt to be secured together, said sleeve and said anchor belt having fastening means thereon for securing said sleeve to said anchor belt.

2. The seatbelt of claim 1 wherein said fastening means comprises at least one hooked pad of Velcro material.

3. The seatbelt of claim 1 wherein said fastening means comprises looped fastening means on said sleeve and a hooked pad of Velcro material secured to said anchor belt.

4. The seatbelt of claim 1 wherein said fastening means comprises mating snap fastener elements attached to said sleeve and said anchor belt.

5. A hold down device for securing a loose end of a seatbelt to a vehicle seat when the seatbelt is not in use, said device comprising a sleeve adapted to be fitted over a doubled over portion of an adjustable section of said seatbelt, and an anchor belt adapted to be wrapped completely around and attached to said seat, said anchor belt having cooperating attachment means at the opposite ends thereof to enable said ends to be secured together, said sleeve and said anchor belt both having fastening means thereon for securing said sleeve to said anchor belt.

6. The hold down device of claim 5 wherein said fastening means comprises at least one hooked pad of Velcro material.

7. The hold down device of claim 5 wherein said fastening means comprises looped fastening means on said sleeve and a hooked pad of Velcro material secured to said anchor belt.

8. The hold down device of claim 5 wherein said fastening means comprises mating snap fastener elements attached to said sleeve and said anchor belt.

References Cited

UNITED STATES PATENTS

| | | | |
|---|---|---|---|
| 2,863,196 | 12/1958 | Shears | 24—73 |
| 2,888,063 | 5/1959 | Rose | 297—387 |
| 3,076,679 | 2/1963 | Lorber | 297—385 |
| 3,154,837 | 11/1964 | De Mestral | 24—204 X |
| 3,178,224 | 4/1965 | Anderson et al. | 297—385 |
| 3,251,109 | 5/1966 | Wilson et al. | 24—77 |
| 3,259,434 | 7/1966 | Frey | 297—385 |
| 3,291,528 | 12/1966 | Sencabauh | 297—385 |
| 3,298,739 | 1/1967 | Scruggs. | |

JAMES T. McCALL, Primary Examiner

U.S. Cl. X.R.

24—204